(12) United States Patent
Bridgelall (10) Patent No.: US 6,895,219 B2
(45) Date of Patent: May 17, 2005

(54) DUAL USE OF FFT CIRCUITY IN IMAGERS AND TRANSCEIVERS

(75) Inventor: Raj Bridgelall, Mount Sinai, NY (US)

(73) Assignee: Symbol Technologies Inc., Holtsville, NY (US)

( * ) Notice: Subject to any disclaimer, the term of this patent is extended or adjusted under 35 U.S.C. 154(b) by 518 days.

(21) Appl. No.: 09/939,861

(22) Filed: Aug. 27, 2001

(65) Prior Publication Data

US 2003/0040275 A1 Feb. 27, 2003

(51) Int. Cl.[7] .................................................. H04B 5/00
(52) U.S. Cl. ........................................ 455/41; 455/414.1
(58) Field of Search ................................ 455/41, 414.1

(56) References Cited

U.S. PATENT DOCUMENTS

| 5,640,002 A | 6/1997 | Ruppert et al. |
| 5,710,728 A | 1/1998 | Danielson et al. |
| 5,834,753 A | 11/1998 | Danielson et al. |
| 5,999,824 A | 12/1999 | Na |
| 2002/0139858 A1 * | 10/2002 | Bridgelall .............. 235/462.46 |

FOREIGN PATENT DOCUMENTS

| EP | 0 780 993 A2 | 6/1997 |
| EP | 0 851 598 A2 | 7/1998 |
| GB | 2 320 631 A | 6/1998 |
| GB | 2 320 858 A | 7/1998 |
| GB | 2 354 360 A | 3/2001 |
| GB | 2 357 189 A | 6/2001 |
| WO | WO 01/37437 A2 | 11/2000 |

* cited by examiner

*Primary Examiner*—Creighton H Smith
(74) *Attorney, Agent, or Firm*—Kirschstein, et al.

(57) ABSTRACT

An auto ID reader and one or two radio frequency transceivers are supported on a common support having a predetermined form factor, such as that of a scan engine module commonly utilized in hand-held bar code symbol scanners. Common digital processing circuitry is used for processing the signal from the auto ID sensor and an RF transceiver baseband signal, making a highly integrated and compact arrangement. A single Fast Fourier Transform circuit is utilized for each transceiver.

16 Claims, 6 Drawing Sheets

DUAL USE OF FFT CIRCUITRY IN IMAGERS AND TRANSCEIVERS

REFERENCE TO RELATED APPLICATION

This application is related to U.S. patent application Ser. No. 09/843,946 filed Apr. 30, 2001.

BACKGROUND OF THE INVENTION

Field of the Invention

The present invention generally relates to mobile computers and RF communications modules or cards for use in such computers, and methods of utilizing baseband processor circuitry in such modules to achieve multi-radio capabilities in a small, compact form factor by making dual use of such circuitry in each radio.

Wireless networks use infrared or radio frequency communications channels to communicate between portable or mobile computer terminals and stationary access points or base stations. These access points are in turn connected by a wired (or possibly wireless) communication channel to a network infrastructure which connects groups of access points together to form a local or wide area network, including, optionally, one or more servers or host computer systems, or gateways to the public switched telephone network.

Wireless and radio frequency (RF) protocols are known which support the logical interconnection of portable roaming terminals having a variety of types of communication capabilities to host computers. The logical interconnections are based upon an infrastructure in which at least some each of the remote terminals are capable of communicating with at least two of the access points when located within a predetermined range therefrom, each terminal unit being normally associated with and in communication with a single one of such access points. Based on the overall spatial coverage and layout, response time, and loading requirements of the network, different modulation schemes, power limitations, and communication protocols have been designed so as to most efficiently regulate the communications between a given terminal and the network through the selected access point. For local area networks, one such protocol is set forth in the ISO/IEC 8802-11, or ANSI/IEEE Std 802.11 entitled "Wireless LAN Medium Access Control (MAC) and Physical Layer (PHY) Specifications" (1999 edition) available from the IEEE Standards Department, Piscataway, N.J. (hereinafter the "IEEE 802.11 Standard"), and in the Personal Communication Service area, another is a wide area network standard (WCDMA).

One type of mobile computer terminal coupled to or incorporating a bar code symbol reader, are now very common for data collection applications. Typically, a bar code symbol comprises one or more rows of light and dark regions, typically in the form of rectangle. The relative widths of the dark regions, i.e., the bars and/or the widths of the light regions, i.e., the spaces, between the bars encode data or information in the symbol.

A bar code symbol reader illuminates the symbol and senses light reflected from the regions of differing light reflectivity to detect the relative widths and spacings of the regions and derive the encoded information. Bar code reading type data input systems improve the efficiency and accuracy of data input for a wide variety of applications. The ease of data input in such systems facilitates more frequent and detailed data input, for example to provide efficient taking of inventories, tracking of work in progress, etc.

A variety of bar code reader scanning systems are known. One particularly advantageous type of reader is an optical scanner which scans a beam of light, such as a laser beam, across the symbols. Moving beam laser scanner systems and components of the type are exemplified by U.S. Pat. Nos. 4,387,297 and 4,760,248 which are owned by the assignee of the instant invention and are incorporated by reference herein. Moving beam laser scanners are not the only type of optical instrument capable of reading symbols. Another type of reader referred to as an "imager," is one which incorporates tow dimensional solid state sensor or linear charge coupled device (CCD) technology. The entire symbol is flooded with light from a light source such as a light emitting diode (LED) in the scanning device, and each pixel or CCD cell is sequentially read out to determine the presence of, for example, a bar or a space. As an example of a CCD reader, U.S. patent application Ser. No. 09/096,578, filed Jun. 12, 1998, of Correa et al. is hereby incorporated by reference.

In automatic identification and data capture (AIDC) industry, certain module form factors, i.e., specific space allocations assemblies or devices having known functionalities, have become standards. The PC card or compact flash card is one such example in the portable computer industry. Another such form factor for a bar code reader laser scan engine module known as the "SE 1200" has been adopted by the AIDC industry and is produced by Symbol Technologies, Inc. of Holtsville, N.Y., the assignee of the instant application. The SE 1200 module is used in hand-held portable computers for reading bar code symbols and has a parallelepiped shape measuring 1½ inches in length, 1 inch in width, and ¾ of an inch in height.

SUMMARY OF THE INVENTION

1. Objects of the Invention

Accordingly, it is a general object of this invention to provide a single integrated circuit for use by two distinct RF transceivers and optionally an auto ID reader, all mounted on a common support, especially on a standard form factor for use in mobile computers.

It is another object of this invention to provide a module utilizing common baseband digital signal processing circuitry for an auto ID reader and a radio transceiver.

2. Features of the Invention

In keeping with the above objects and others which will become apparent hereafter, one feature of the present invention resides, briefly stated, in a dual radio frequency (RF) transceiver and a auto ID reader both supported on a common support having a predetermined form factor. Each RF transceiver is operative for communicating with a computer network, through different communications channels such as a wireless LAN or WAN, GPRS, CDPD, GSM cellular telephone network. The auto ID reader is operative for sensing encoded data on a label or card, such as a identification card, and for imaging and/or reading the encoded data of a bar code symbol.

In a preferred embodiment, electrical components for the RF transceivers and the auto ID reader are mounted on a printed circuit board supported by the module. These components generate digital signals corresponding to the RF signal data and the encoded data. A single ASIC is supported by the module and receives and processes these digital signals, and outputs the processed signals through a common interface to the host computer.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENT

Figure 1:
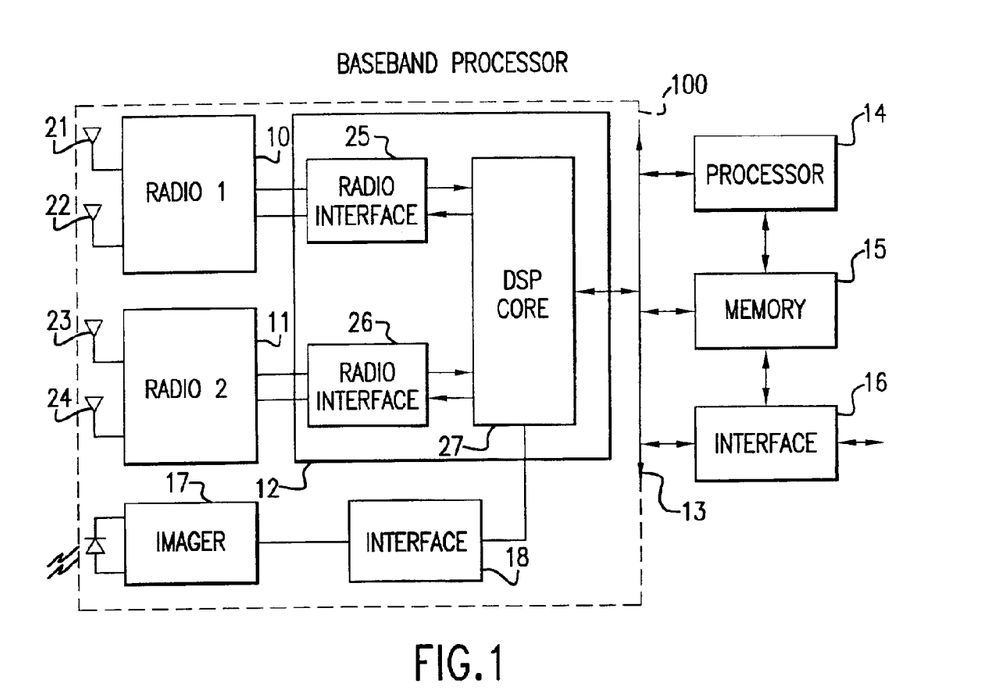
FIG. 1 is a block diagram of a dual RF transceiver and an auto ID reader circuit together with a single IC baseband processor circuit in accordance with this invention.

Details of the present invention will now be described, including exemplary aspects and embodiments thereof. Referring now to the drawings, reference numeral 100 generally identifies a block diagram of a module according to this invention. Module 100 includes a first RF subassembly 10 having a wireless data transceiver for emitting RF energy via an antenna 21, 22 to communicate with a remote base station (not shown) associated with a computer network. The RF subassembly 10 may use any low power, communications protocol, such as an OFDM radio, and is operative for transmitting data collected by the mobile unit directly to the base station and thereby to the network.

Module 100 also includes a second RF subassembly 11 having a wireless data transceiver for emitting RF energy via an antenna 23, 24 to communicate with a remote base station (not shown) associated with a computer network. The RF subassembly 11 may use any other low power, communications protocol, such as WCDMA, and is operative for transmitting data collected by the mobile unit directly to the base station and thereby to the network.

Module 100 may further include an auto ID reader which may be a bar code reader or imager, a smart card reader, a digital sensor, a biometric sensor such as a fingerprint detector, a magnetically encoded data reader (e.g. a disk reader or a stripe reader), or an optical or OCR reader, etc.

The baseband processor 12 includes a DSP core 27, and a first radio interface 25 which connects the core 27 to radio 11. A key feature of the present invention is the use of a common DSP core 27 for each of the radios, thereby eliminating the duplication of the same or similar circuit elements for each radio.

The base station emits an RF signal which is detected by the antenna 21 or 23 in the respective radios in the module. A second antenna 22 or may also be deployed in each respective radio in the module for antenna diversity, and when we refer to the "antenna" we shall mean either antenna 21 or 22, or 23 or 24. The received RF signal, for communications protocol synchronization or acknowledgement purposes, is conducted to the wireless transceiver 111 which performs RF demodulation and thereupon the analog baseband signal is processed in a signal processor 12, which comprises an amplifier, a bandpass filter, a multiplier for sampling the received signal at a rate controlled by a counter to produce a sampled signal, a peak detector for determining the magnitude and duration of the peaks in the sampled signal, an automatic gain controller, and a digitizer for converting the analog sampled signal to a digital signal. The digital signal is then conducted over a connector or bus 13 to a host computer unit which includes the central processor unit (CPU) 14 for processing in accordance with a stored algorithm. A memory 15 is connected to the CPU for data storage and retrieval. An output signal from the CPU is conducted therefrom through an interface 16, typically a serial or parallel port through which data may flow to other wired units, such as printers, charging cradles, etc.

Reference numeral 17 generally identifies an auto ID reader circuit having at least one sensor (shown as a solid state or CCD imager), connected to an interface or signal preprocessor circuit 18, which is connected to the baseband processor 12.

Figure 2:
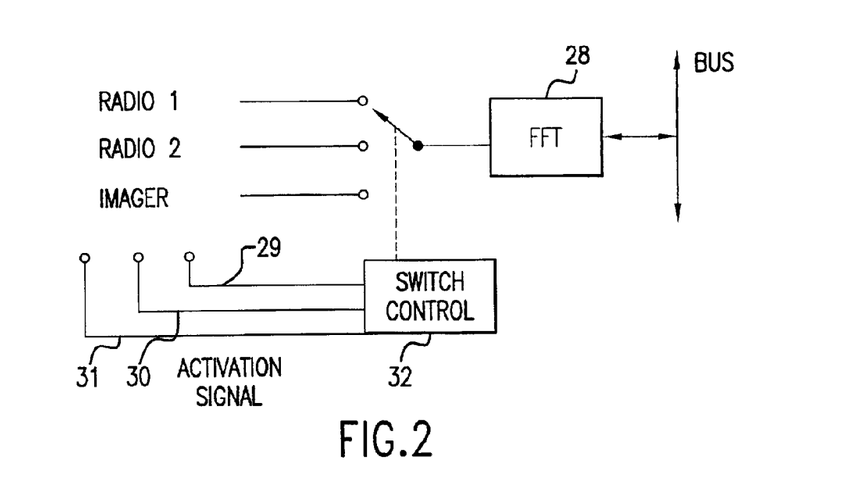
FIG. 2 is a block diagram of an embodiment of the invention in which a single FFT circuit is utilized by each dual RF transceiver.

FIG. 2 is a highly simplified block diagram of an embodiment of the invention of FIG. 1 in which the baseband processor 12 includes a Fast Fourier Transform circuit 28, as will be described in greater detail below. The figure illustrator three possible signal sources, radio 1, radio 2, and imager which can utilize the FFT circuit, but such sources are merely exemplary. As activation signal 29, 30, or 31 is sent to a switch control 32 to connect the FFT circuit 28 to the respective signal source currently in operation. The FFT circuit 28 may be part of the DSP core 27 of FIG. 1, or may be connected to as bus, such as shown in FIG. 2.

As described so far, the RF transceivers 10, 11 and the auto ID reader circuit 17 share the common baseband processor 12. Various aspects of the processor 12 may be implemented in digital circuitry, or in computer hardware, firmware, software, or in combinations of them. Apparatus of the invention may be implemented in computer products tangibly embodied in a machine-readable storage device for execution by a programmable processor, or on software located in memory. Although a single ASIC is preferred for processor 12, the foregoing techniques may be performed, for example, by a single micro processor, a multiprocessor, one or more digital signal processors, gate arrays of logic gates, or hardwired logic circuits for executing a sequence of signals or program of instructions to perform functions of the invention by operating on input data and generating output. The methods may advantageously be implemented in one or more computer programs that are executable on a programmable system including at least one programmable digital signal processor coupled to receive data and instructions from, and to transmit data and instructions to, a data storage system, at least input device, and at least one output device. Each computer program may be implemented in a high-level procedural or object-oriented programming language, or in assembly or machine language if desired; and in any case, the language may be compiled or interpreted language. Suitable processors include, by way of example, both digital signal processors, or general and special purpose microprocessors. Generally, a processor will receive instructions and data from read-only memory and/or random access memory. Storage devices suitable for tangibly embodying computer program instructions and data include all forms of non-volatile memory, including by way of example, semiconductor devices, such as EPROM, EEPROM, and flash memory devices; magnetic disks such as internal hard disks and removable disks; magneto-optical disks; and CD-ROM disks. Any of the foregoing may be supplemented by or incorporated in, specially designed application-specific integrated circuits (ASICs).

Figure 3:
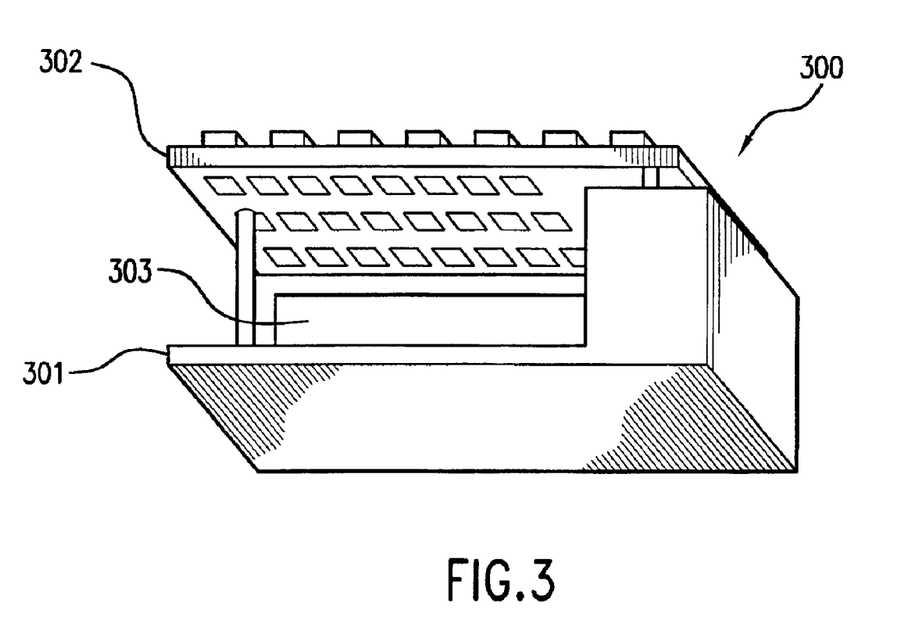
FIG. 3 is a perspective view, from the front and below, of a module for supporting the circuits of FIG. 1.

As shown in FIG. 3, reference numeral 300 generally identifies a common support such as the aforementioned SE 1200 laser scan engine module on which the dual RF transceivers and an auto ID reader are supported. The support includes a generally planar base 301 and a printed circuit board 302 mounted in a plane generally parallel to and elevated relative to the base. The auto ID reader (not shown) is implemented inside the module, in the region, as shown by reference numeral 303.

Figure 4:
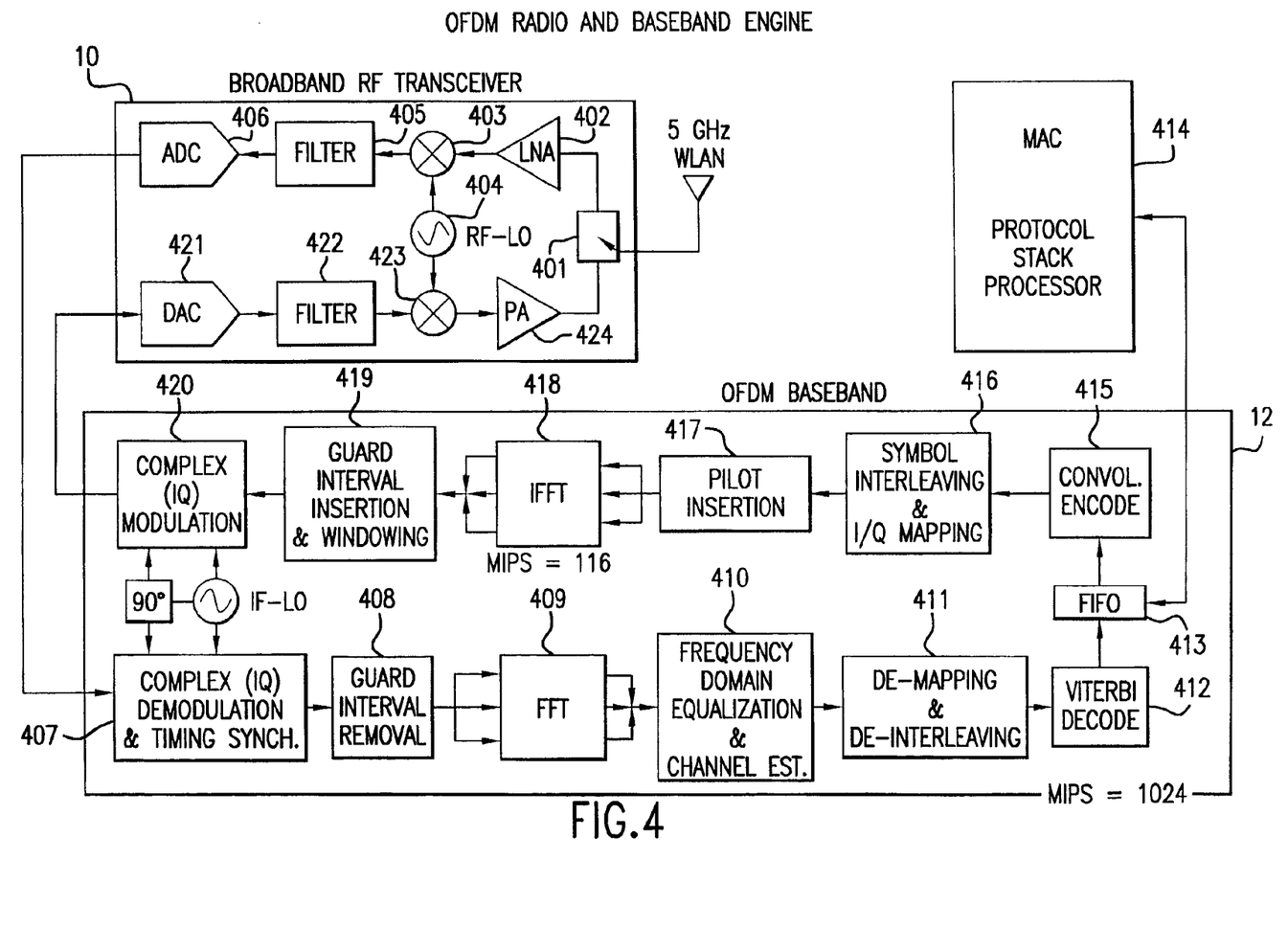
FIG. 4 is a block diagram of an OFDM RF transceiver used in the present invention.

FIG. 4 depicts an example of a first RF subassembly and corresponding bandband circuitry illustrating an orthogonal frequency division multiplexing (OFDM) radio. The IEEE 802.11a standard specifies a PHY layer operating in the 5 GHz band, open to unlicensed devices in the U.S., based on the orthogonal frequency division multiplexing technique to modulate the data. In OFDM, digital data is distributed among a large number of adjacent carriers so that only a relatively small amount of data is carried on each carrier. Adjacent carriers are mathematically orthogonal. The sidebands of adjacent carriers may overlap, but signals can be received without adjacent carrier interference. The main benefit of OFDM modulation is its robustness to multipath echoes, which are encountered in the indoor and mobile environments.

In the IEEE 802.11a standard, each OFDM symbol is composed of fifty-two non-zero subcarriers of which forty-eight are data subcarriers and the remaining four are carrier pilot subcarriers. The data rates range from 6 Mbit/s up to 54 Mbit/s, with 20 MHZ spacing between adjacent channels. All implementations are required to support 6, 12 and 24 Mbit/s. Optional extensions are for 9, 18, 36, 48 and 54 Mbit/s. The range of data rates is provided to match the wide range of radio channel characteristics in both indoor and outdoor environments. The multirate mechanism of the IEEE 802.11 MAC protocol is utilized with the IEEE 802.11a PHY and ensures that all devices communicate with each other at the best data rate in the present channel.

In a conventional single-carrier digital communication system, data symbols are transmitted serially using some modulation scheme, and the spectrum of each symbol is allowed to occupy the entire channel bandwidth. In multi-carrier modulation schemes, data symbols are transmitted in parallel on multiple subcarriers that share the channel backwidth using some form of frequency-division multiplexing (FDM). The modulation scheme on one subcarrier may be chosen independent of that used on other subcarriers. Thus, subcarriers in frequency segments of the channel with a high signal-to-noise ratio (SNR) may use high-rate modulation, while those with degraded SNR use low-rate modulation, or are not modulated.

In OFDM the spectra of the subcarriers overlap, and their spacing is chosen so that each subcarrier is orthogonal to all other subcarriers. The common method of obtaining orthogonality of subcarriers is to choose their frequency spacing equal to the inverse of the subcarrier symbol duration. Baseband processing of the OFDM signal is then conveniently effected using the discrete Fourier transform, implemented as an inverse fast Fourier transform (IFFT) and a fast Fourier transform (FFT) that modulate and demodulate parallel data blocks, respectively. The set of subcarriers generated during one transform defines an OFDM symbol. The subcarriers are conveyed by serial transmission over the channel of the time samples generated by the IFFT. The duration of the OFDM symbol, which is the same as that of the subcarrier symbol, is thus equal to the time window of the transform.

To illustrate one such system, U.S. Pat. No. 5,838,734 is hereby incorporated by reference. Such patent discloses an FFT with outputs for the I and Q values of each of the carriers which were originally encoded at the transmitter. These pass to a converter which derives the magnitude Z for each vector from the quadrature amplitude modulation (QAM) phase diagram which they represent. These I and Q values also pass to a converter which derives an angle for each vector in the QAM phase diagram and supplies this to a phase error analyzer as well as to a phase error compensator. The phase error analyzer removes phase noise due to the local oscillator, and the phase angles are then corrected in the phase error compensator to provide a corrected output.

More specifically, FIG. 4 shows an antenna (denoted 5 GHz WLAN) connected to a receive/transmit switch 401. On the receive side, switch 401 is connected to an LNA 402. The output of the LNA 402 is connected to a multiplier 403. The output of the multiplier 403 is connected to a filter 405. The output of filter 405 is connected to analog-to-digital converter ADC 406, which connects to Complex (IQ) Demodulation & Timing Synchronization. Circuit 407. The output of the Complex (IQ) Demodulation & Timing Synchronization. Circuit 407 is connected to the Guard Interval Removal Circuit 408, which is connected to the FFT 409. The output of the FFT 409 is the Frequency Domain Equalization & Channel Est. Circuit 410, whose output is connected to the De-Mapping & De-Interleaving Circuit 411. The output of the De-Mapping & De-Interleaving circuit is connected to Viterbi Decode Circuit 412, whose output in turn is connected to FIFO 413. FIFO 413 is connected to the MAC Protocol Stack Processor 414.

The output of the Protocol Stack Processor 414 is connected back to the FIFO 413, whose output is connected to Convolution Encoder 415. The output of Convolution Encoder 415 is connected to Symbol Interleaving & I/Q Mapping 416. The output of 416 is joined to Pilot Insertion 417 and the output of 417 connects to IFFT 418. IFFT 418 connects to the Guard Interval Insertion & Windowing Circuit 419, which connects to the Complex (IQ) Modulation Circuit 420.

Finally, Complex (IQ) Modulation Circuit 420 is connected to the Broadband RF Transceiver system at the digital-to-analog converter DAC 421. The output of DAC 421 is connected to filter 422, whose output is connected to a multiplier 423. The output of multiplier 423 is connected to Power Amplifier 424, which is connected to the antenna (5 GHz WLAN).

Figure 5:
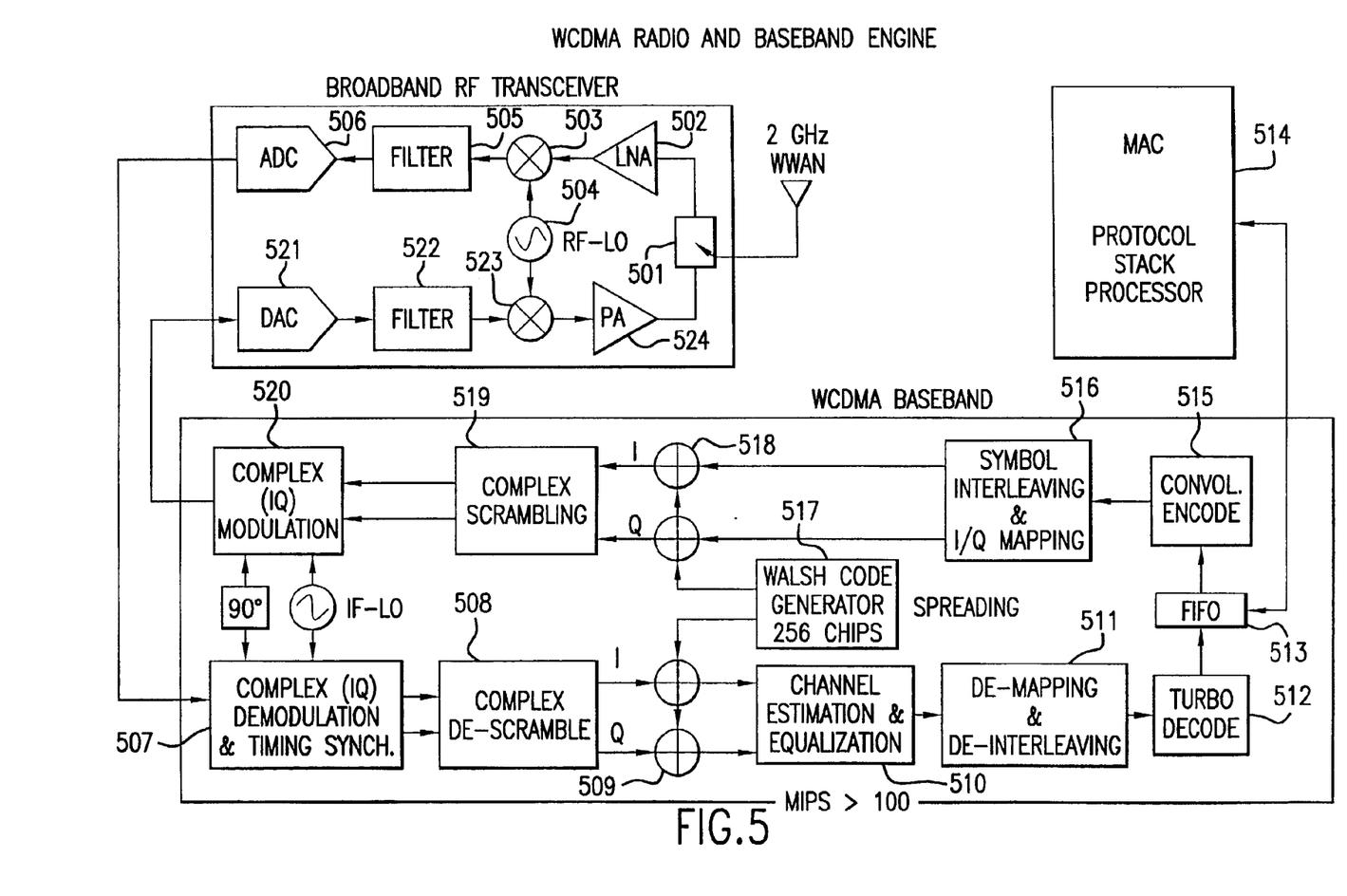
FIG. 5 is a block diagram of a WCDMA RF transceiver used in the present invention.

More specifically in FIG. 5, an antenna (denoted 2 GHz WWAN) is connected to a receive/transmit switch denoted as 501. On the receive side, switch 501 is connected to an LNA 502. The output of LNA 502 is connected to a multiplier 503, whose output is connected to a Filter 505. Filter 505 connects to ADC 506.

The output of ADC 506 is connected to the WCDMA Baseband IC at the Complex (IQ) Demodulation & Timing Synchronization Circuit, 507, whose output is connected to the Complex De-Scramble Circuit, 508. Circuit 508 is connected to a multiplier, labeled as 509, whose output connects to the Channel Estimation & Equalization Circuit, labeled as 510. Circuit 510 connects to the De-Mapping & De-Interleaving Circuit, 511, whose output is connected to the Turbo Decode Circuit, 512. Following Circuit 512 is FIFO 513, which is connected to the MAC Protocol Stack Processor, 514.

The output of the Protocol Stack Processor 514 is connected back to the FIFO 513, whose output is connected to Convolution Encoder 515. The Encoder connects to the Symbol Interleaving & I/Q Mapping Circuit, 516, whose output connects to both the Walsh Code Generator of 256 Chips, 517, and multiplier 518. The output of 518 connects to the Complex Scrambling Circuit, 519, whose output then connects to the Complex (IQ) Modulation Circuit, 520.

Finally, the Complex (IQ) Modulation Circuit, 520 is connected to the Broadband RF Transceiver System at the DAC 521. The output of DAC 521 is connected to Filter 522, whose output is connected to a multiplier 523. The output of multiplier 523 is connected to Power Amplifier 524, which is connected to the antenna (2 GHz WWAN).

Figure 6:
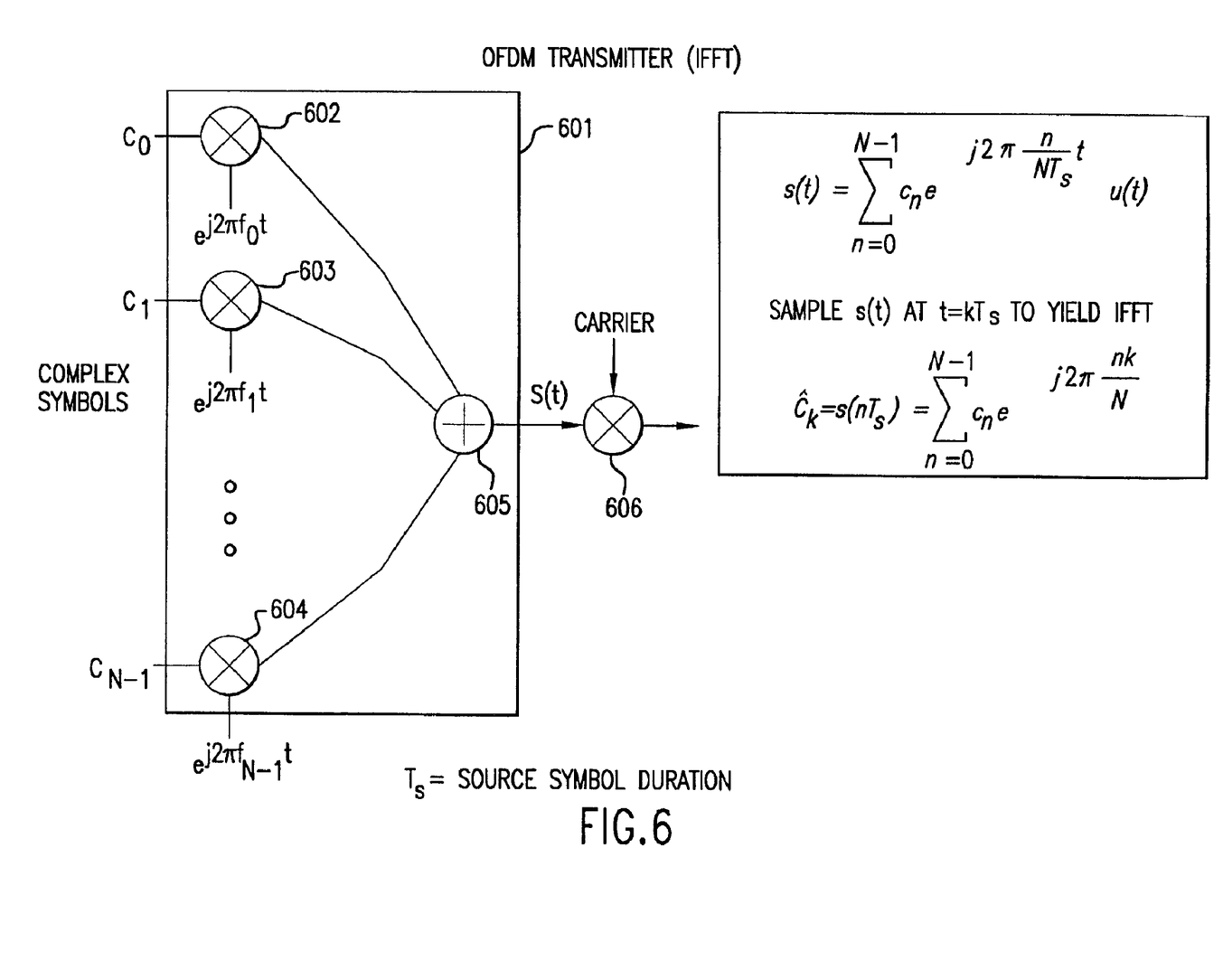
FIG. 6 is a schematic diagram of an circuit used in the transceiver of FIG. 4.

FIG. 6 is a schematic diagram of the implementation of an inverse Fast Fourier Transform in the OFDM transceiver of FIG. 4. More particularly, processing module 601 includes a sequence of multipliers 602, 603, 604 which operate on input symbols $C_0, C_1, \ldots C_{N-1}$, by multiplying them by the exponential factors shown more specifically in the Figure. The resulting products are then summed in unit 605, whose output is provided to an input of multiplier 606, where the output is multiplied by a carrier signal. The equations representing the IFFT process are also set forth in the Figure for reference.

Figure 7:
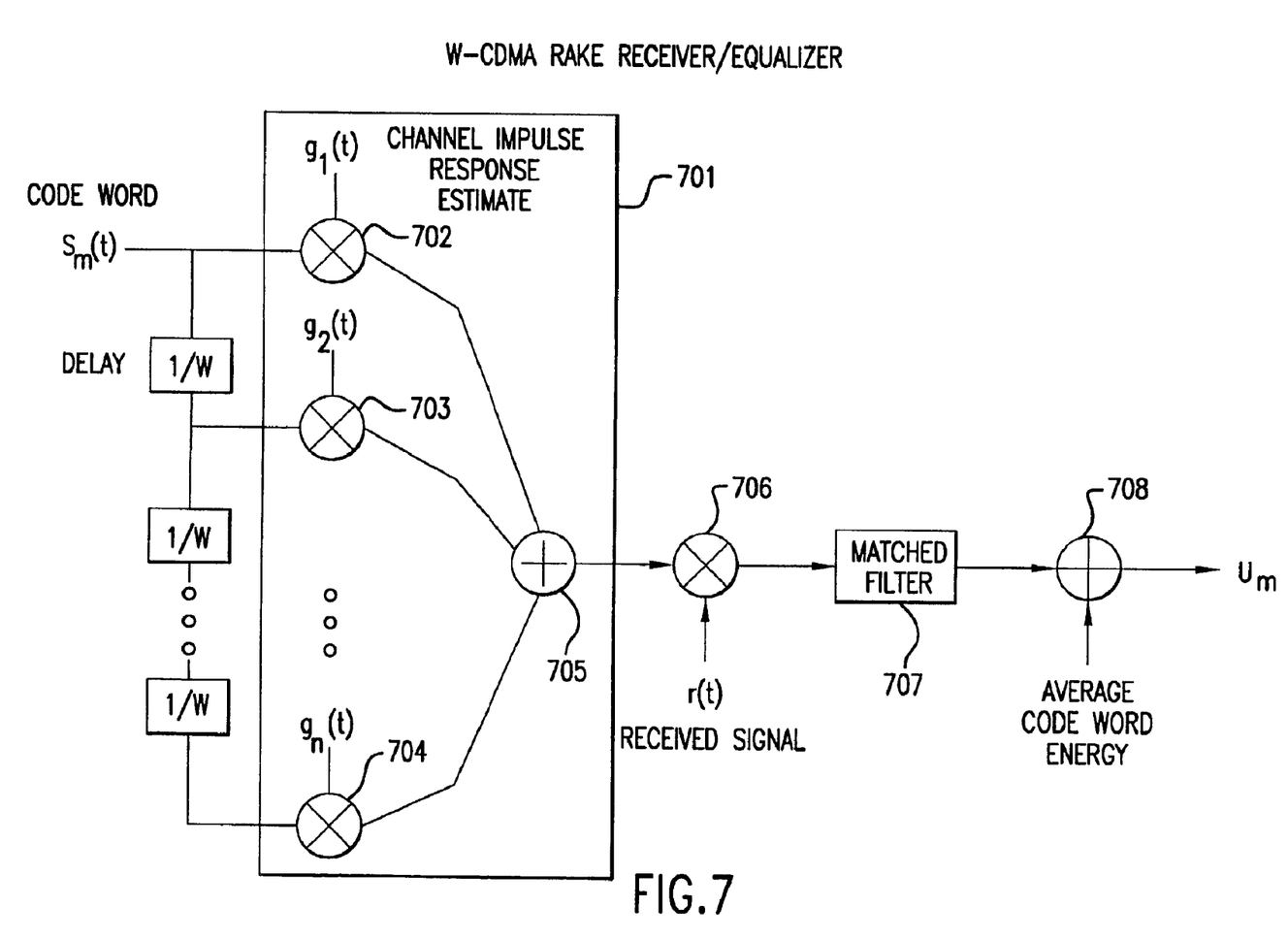
FIG. 7 is a schematic diagram of the circuit of FIG. 6 as modified according to the present invention so as to be used in the transceiver of FIG. 5.

FIG. 7 is a schematic diagram of the implementation of a Rake receiver/equalizer that might be used in a WCDMA transceiver. Rake receivers are known from Price, R. et al, Proc. IRE 46,555–570 (1958) and represent a demodulation structure for a plurality of multipath propagation paths. Each multipath component demodulation is a "finger" of the Rake. The demodulation forms a weighted, phase-adjusted, delay-adjusted sum of code word components by multiplying the channel impulse response estimates $g_1, g_2, g_3, \ldots$ using the multipliers 702, 703, 704, . . . and the summer 705.

Although the auto ID reader is preferably a solid state sensor or CCD imager, it may also be a laser scan engine subassembly, and including a laser diode for emitting a laser beam, lenses for focusing the laser beam, a scan mirror for reflecting the beam outwardly of the module, a drive for moving the scan mirror and sweeping the beam across a bar code symbol for reflection therefrom, a photodiode for detecting the reflected light, and a collection mirror and collection optics for collecting the reflected light and directing it to the photodiode. The interface 18 may couple the output to the baseband processor 12 for processing and digitizing a detected signal generated by the photodiode.

It will be understood that each of the elements described above, or two or more together, also may find a useful application in other types of constructions differing from the types described above.

While the invention has been illustrated and described as embodied in an IC used in a auto ID reader and single or dual radio frequency transceiver in a module, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set fourth in the appended claims:

1. A radio frequency (RF) communications module, comprising:
  a) a support having a predetermined form factor;
  b) a first RF transceiver supported by the support, and operative for transmitting data according to a first communications standard;
  c) a second RF transceiver supported by the support, and operative for transmitting the data according to a second communications standard different from the first standard; and
  d) a common baseband processor coupled to the first and second RF transceivers for processing a baseband signal in each RF transceiver.

2. The module of claim 1, wherein the form factor occupies a space of approximately 1-½ inch×1 inch×¾ inch.

3. The module of claim 1, wherein the first RF transceiver includes a first antenna and a second antenna.

4. The module of claim 1, further comprising a reader supported by the support, and operative for sensing encoded data on a carrier positioned near the reader and for reading the encoded data.

5. The module of claim 4, wherein the support includes a printed circuit board on which electrical circuit components for the RF transceivers and the reader are mounted.

6. The module of claim 4, wherein the RF transceivers and the reader are supported within the predetermined form factor.

7. The module of claim 4, wherein the RF transceivers and the reader generate respective digital signals, and wherein the processor receives and processes each of the digital signals using a single fast Fourier transform circuit.

8. The module of claim 1, wherein the first standard is an orthogonal frequency division multiplexing (OFDM) communications standard, and wherein the second standard is a wideband code-division, multiple-access (WCDMA) communications standard.

9. The module of claim 4, wherein the reader is an imager for imaging a two-dimensional image on the carrier over a field of view.

10. A mobile computer collection terminal, comprising:
  a) a handheld housing;
  b) a support supported by the housing and having a predetermined form factor; and
  c) a first and a second radio frequency (RF) transceiver supported by the support, and operative for respectively communicating with a first and a second RF base station respectively associated with a first and a second computer network for transferring data between the terminal and the networks.

11. The terminal of claim 10, further comprising a reader supported by the support, and operative for sensing encoded data on a carrier and for reading the encoded data.

12. The terminal of claim 10, wherein the form factor occupies a space of approximately 1-½"×1"×¾".

13. The terminal of claim 11, wherein the support includes a printed circuit board on which electrical circuit components for the RF transceivers and the reader are mounted.

14. The terminal of claim 10, wherein each RF transceiver includes a first antenna and a second antenna.

15. The terminal of claim 10, wherein the RF transceivers respectively transmit the data using different communications standards.

16. The terminal of claim 15, wherein one of the standards is orthogonal frequency division multiplexing (OFDM), and wherein another of the standards is wideband code-division, multiple-access (WCDMA).

* * * * *